United States Patent
Ho et al.

(10) Patent No.: US 9,047,570 B2
(45) Date of Patent: Jun. 2, 2015

(54) EVOLVING ALGORITHMS FOR TELECOMMUNICATIONS NETWORK NODES BY GENETIC PROGRAMMING

(75) Inventors: Lester Tse Wee Ho, Blanchardstown (IE); Louis Gwyn Samuel, Dublin (IE); Holger Claussen, Straffan (IE); Imran Ashraf, Wiltshire (GB)

(73) Assignee: Alcatel Lucent, Boulogne-Billancourt (FR)

( * ) Notice: Subject to any disclaimer, the term of this patent is extended or adjusted under 35 U.S.C. 154(b) by 380 days.

(21) Appl. No.: 13/376,513

(22) PCT Filed: Jun. 4, 2010

(86) PCT No.: PCT/EP2010/003632
§ 371 (c)(1),
(2), (4) Date: Feb. 21, 2012

(87) PCT Pub. No.: WO2010/142464
PCT Pub. Date: Dec. 16, 2010

(65) Prior Publication Data
US 2012/0142331 A1    Jun. 7, 2012

(30) Foreign Application Priority Data
Jun. 11, 2009    (EP) .................................... 09290436

(51) Int. Cl.
*H03C 1/62*    (2006.01)
*H04L 12/28*    (2006.01)
*G06N 3/12*    (2006.01)

(52) U.S. Cl.
CPC ...................... *G06N 3/126* (2013.01)

(58) Field of Classification Search
CPC ...................................................... G06N 3/126
USPC .............. 455/418, 115.1, 3.06; 370/400, 465, 370/255
See application file for complete search history.

(56) References Cited

U.S. PATENT DOCUMENTS 6,625,135 B1   9/2003   Johnson et al.
7,471,928 B2   12/2008  Axnas et al.
(Continued)

FOREIGN PATENT DOCUMENTS

EP    2230634 A1   9/2010
GB    2390775 A    1/2004
(Continued)

OTHER PUBLICATIONS

Abedi et al., Hybrid Genetic Packet Scheduling and Radio Resource Management for High Speed Downlink Packet Access, IEEE, 5th International Symposium on Wireless Personal Multimedia Communications, Oct. 27, 2002, V3, pp. 1192-1196.
(Continued)

*Primary Examiner* — Opiribo Georgewill
(74) *Attorney, Agent, or Firm* — Fay Sharpe LLP

(57) ABSTRACT

A method is provided of evolving algorithms for network node control in a telecommunications network node by updating a model of the network node, and genetic programming by (a) generating algorithms, (b) determining fitness level of the algorithms based on the model of the network node, and (c) selecting the algorithm that meet a predetermined fitness level. The steps (a), (b) and (c) are repeated automatically to provide a series of algorithms over time adapted to the changing model of the network node for possible implementation in the network node.

21 Claims, 7 Drawing Sheets

(56) References Cited

U.S. PATENT DOCUMENTS

| | | | |
|---|---|---|---|
| 7,719,973 | B2 | 5/2010 | Abedi |
| 2003/0083936 | A1 | 5/2003 | Mueller et al. |
| 2003/0171132 | A1 | 9/2003 | Ho et al. |
| 2006/0013245 | A1 | 1/2006 | Abedi |
| 2008/0261516 | A1* | 10/2008 | Robinson ............... 455/3.06 |
| 2009/0082034 | A1 | 3/2009 | Gray et al. |
| 2009/0088171 | A1 | 4/2009 | Aoyama et al. |
| 2010/0062770 | A1* | 3/2010 | Flynn et al. ............... 455/436 |

FOREIGN PATENT DOCUMENTS

| | | | |
|---|---|---|---|
| JP | 2006-514518 | A | 4/2006 |
| JP | 2006-518126 | A | 8/2006 |
| JP | 2007-158728 | A | 6/2007 |
| WO | 0178434 | A1 | 10/2001 |
| WO | 2007060808 | A1 | 5/2007 |

OTHER PUBLICATIONS

English Bibliography for JP Pat. App. Publication No. JP 2006-514518, Published Apr. 27, 2006, in Japanese, Printed From Thomson Innovation on Jun. 12, 2013, 4 PP.

English Bibliography for JP Pat. App. Publication No. JP 2006-518126, Published Aug. 3, 2006, in Japanese, Printed From Thomson Innovation on Jun. 12, 2013, 4 PP.

English Bibliography for JP Pat. App. Publication No. JP 2007-158728, Published June 21, 2007, in Japanese, Printed From Thomson Innovation on Jun. 12, 2013, 3 PP.

Self-Evolving Networks, High Performance, Scaleable & Adaptive Solutions for Future Networks, Bell Labs Alcatel-Lucent Bell Labs Ireland Innovation Day, May 2009, 7 pages.

Sabnani, Autonomic Networking Research at Bell Labs, Bell Labs/Alcatel-Lucent, Proceedings of the ASN Symposium, Nov. 2008, 16 pages.

Lewis, et al.; Enhancing IEEE802.11 DCF using Genetic Programming, Proceedings of IEEE VTC, 2006, pp. 1261-1265.

Hu et al.; Wireless Access Point Configuration by Genetic Programming, Proceedings of IEEE CEC, 2004, pp. 1178-1184.

Polakos et al., "Beyond the Base Station Router . . . ," Alcatel-Lucent Innovation Days, XP007909376, 7 pages, Dec. 2008.

Claussen, "Autonomous Self-deployment of Wireless Access Networks in an Airport Environment," Lecture Notes in Computer Science, vol. 3854, XP019029298, pp. 86-98, Feb. 27, 2006.

Mullany et al., "Self-deployment, Self-configuration: Critical Future Paradigms for Wireless Access Networks," Lecture Notes in Computer Science, vol. 3457, XP019012576, pp. 58-68, Jul. 2, 2005.

Nguyen et al., "Learning from Nature: Network Architecture Inspired by Biology," Crossroads, vol. 11, No. 4, XP007909401, 2005.

International Search Report for PCT/EP2010/003632 dated Jul. 28, 2010.

English Bibliography for PCT Patent Publication WO 2007/060808A1, published May 31, 2007, printed from Thomson Innovation on Dec. 17, 2014, 3 pp.

PCT Pat. App. No. PCT/EP2010/003632, Written Opinion of the International Searching Authority, mailed Jul. 27, 2010, 5 pp.

EP Pat. App. No. 09290436.6, Extended European Search Report, mailed Aug. 14, 2009, 6 pp.

* cited by examiner

Automated algorithm creation process.

EVOLVING ALGORITHMS FOR TELECOMMUNICATIONS NETWORK NODES BY GENETIC PROGRAMMING

FIELD OF THE INVENTION

The present invention relates to telecommunications, in particular to telecommunications networks.

DESCRIPTION OF THE RELATED ART

Telecommunications networks increasingly incorporate abilities to self-configure, self-organise and self-adapt. As the size and complexity of telecommunications networks increases, there is a drive to implement these so-called "self-x" properties in a decentralised manner, namely where each node can act individually using only local information.

Accordingly, there is a growing need to develop self-x algorithms, i.e. algorithms for network node self-adaptation, that have to work without global information about the network nor coordinated central control of the network nodes. Some examples of self-x algorithms in wireless networks include algorithms for optimising cell coverage and capacity, and resource scheduling algorithms. Some examples in the field of wireline networks are routing algorithms that operate dependent upon a variety of variables, such as traffic load level, number of hops between nodes along communication paths, and Quality of Service (QoS) requirements.

A known approach is for self-x algorithms to be designed by skilled engineers. based on specific assumptions about the network that may not be realistic, so there is often a need for the algorithms to be evaluated, revised and refined after they have been implemented in networks. This can be a slow and expensive process.

In this known approach, it is difficult for the skilled engineer designing algorithms that take account of the various different environments that the nodes will be deployed in. The algorithms are designed based on specific assumptions about the network that do not hold true in the real world.

In this known approach, a self-x algorithm is designed manually and then the same algorithm is applied across all of the network nodes of a certain type, for example all of the base stations in a wireless cellular network. As there are large differences in operating environments of the nodes, performance is degraded because generally-applicable optimisation algorithms perform less well than algorithms that are more specialised to a particular problem or operating environment. By the way, conversely, specialised algorithms perform less well when applied outside the particular area to which they are specialised.

Referring to another area of background, genetic programming is a known evolutionary approach to generating an algorithm, see for example Koza, J. R., Genetic Programming: On the Programming of Computers by Means of Natural Selection 1992: MIT Press, 840.

Genetic programming is described briefly here to ease the understanding of the reader.

As shown in FIG. 1, genetic programming (GP) involves the following steps:

Initialise a population of algorithms—a population is the term used for a collection of individual algorithms, the algorithms in the initial population being generated at least somewhat randomly;

(ii) Calculate the fitness of each of the algorithms in the population—fitness being the term used for a measure of the algorithms performance in achieving the task of the algorithm;

(iii) Select algorithms to become "parents" based on their fitness;

(iv) Create new algorithms by applying genetic operators, such as mutation and crossover to the parents selected in the previous step;

(v) Produce the next generation population of algorithms using newly created algorithms and survivors chosen from the previous generation population.

The above steps (ii) to (v) are repeated until a termination condition is met (for example the process has gone through a set number of generations, or a target fitness level is met by an algorithm that has been created).

As shown in FIG. 2, a parse tree representation is typically used in genetic programming (GP) in order to encode an algorithm into a form upon which genetic programming operations can be performed. The parse tree can be used to represent various forms of algorithms, such as computer programs. Algorithms can be represented in other forms, such as by state transition diagrams.

FIG. 3 shows illustrative examples of the crossover and mutation operators mentioned above. Crossover is mixing components from two parent algorithms to produce a next generation (i.e child) algorithm. Mutation is modifying part of an individual parent algorithm to produce a next generation algorithm.

Use of genetic programming to generate an algorithm for use in a telecommunications network is described in a paper by Lewis T., Fanning N. and Clemo G. entitled "Enhancing IEEE802.11 DCF using Genetic Programming", IEEE 2006.

SUMMARY

The reader is referred to the appended independent claims. Some preferred features are laid out in the dependent claims.

An example of the present invention is a method of evolving algorithms for network node control in a telecommunications network node by updating a model of the network node, and genetic programming by the steps of (a) generating algorithms, (b) determining fitness level of the algorithms based on the model of the network node, and (c) selecting the algorithm that meet a predetermined fitness level. The steps (a), (b) and (c) are repeated automatically to provide a series of algorithms over time adapted to the changing model of the network node for possible implementation in the network node.

In preferred embodiments, information of the status of the network node is obtained from local measurements, for example made by the node, and/or is provided as information from neighbouring nodes.

In preferred embodiments, each network node uses genetic programming to generate new algorithms for its own use, and information of the network is used to update an internal model of the network node. Preferably, the node uses that model along with genetic programming building blocks to create algorithms that meet a target criterion such as of fitness level. Preferably once such an algorithm is provided, it is tested and if deemed acceptable is implemented in the network node.

In consequence a preferred embodiment may be a network in which each network node runs its own distinct algorithms. The approach allows the nodes to adapt their behaviour flexibly, independently and intelligently.

This approach is suitable to various types of network nodes, for example network nodes that are self-adapting, for example femtocell base stations. The approach is suitable for providing algorithms for implementation that are themselves self-adapting algorithms.

Preferred embodiments relate to networks of cellular radio base stations. Other preferred embodiments relate to other types of telecommunications networks.

Preferred embodiments provide for the creation and adaptation of algorithms locally specialised to network nodes in a distributed manner. Preferred embodiments create and optimise the functional form of algorithms in an autonomous and efficient manner for good network performance.

In some preferred embodiments, steps of providing, verifying and implementing algorithms are repeated from time to time, such as periodically. In some preferred embodiments, the series of algorithms provided are a series of algorithms for network node self-configuring.

BRIEF DESCRIPTION OF THE DRAWINGS

Embodiments of the present invention will now be described by way of example and with reference to the drawings, in which.

DETAILED DESCRIPTION

The inventors realised that, in known wireless networks, use of a large number of user-deployed small cells would allow high data rates and provide high capacity. Such small cells typically have a range of tens or hundreds of metres, and are often referred to as femtocells. However, the inventors realised that a side-effect of using such a large number of small cells is the diversity of environments which the base stations providing those cells would experience. For example, the performance of a femtocell base station can vary drastically dependent upon where the femtocell base station is placed within a building. This is due in part to the effects of various building materials. For example, a glass wall has a very low propagation loss compared to a concrete wall. This is also due in part to the high variability of traffic demand. For example a femtocell base station covering a traffic demand hotspot such as a busy lounge will experience demands that are very different to another femtocell base station covering a quiet area that is, say, twenty metres away.

The inventors also realised that in small cells of this type, the self-x algorithms used to control and optimise base stations must deliver the appropriate performance in diverse environments, such that general purpose algorithms may not be adequate and algorithms are better specialised to particular environments. As an example, a femtocell operating in a residential area having buildings made of concrete may need a radio coverage control algorithm that is of a different form to one operating in a residential area with glass-fronted buildings. However, the inventors realised that the prior art approach of manually designing new algorithms for each different type of environment is impractical due to the complexity and costs involved.

An example network and network node will now be described, before focussing in on an example genetic programming unit and its operation. In this example, the network node is a femtocell base station.

After that, we will describe how a verified algorithm is disseminated to other nodes, before giving a particular example of the type of algorithm. This is followed by a description of some variants and alternatives.

In this description we used the term algorithm to mean a set of rules or a method that is used to solve a problem or perform a task. An algorithm may be specified in the form of a mathematical formula having technical application, a computer program, a representation of a system's behaviour such as a state transition diagram or flowchart. Examples of algorithms in telecommunications network nodes are a method to automatically adjust the coverage area of a radio cell, and a method of routing traffic through a network router node.

Network

Figure 1:
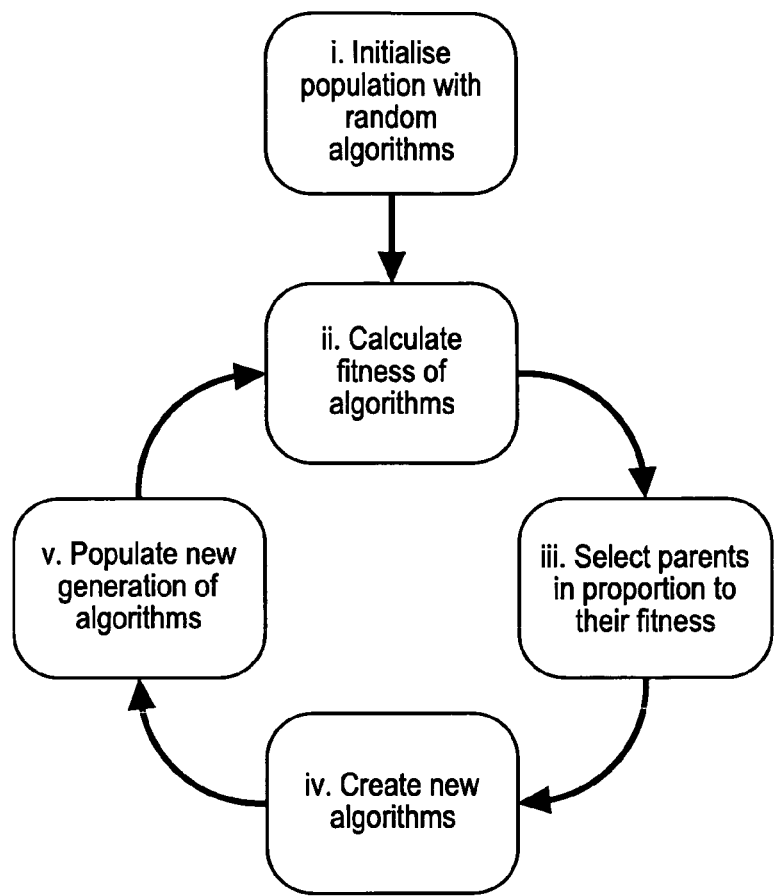
FIG. 1 is a diagram illustrating schematically a genetic programming process (PRIOR ART)
Figure 2:
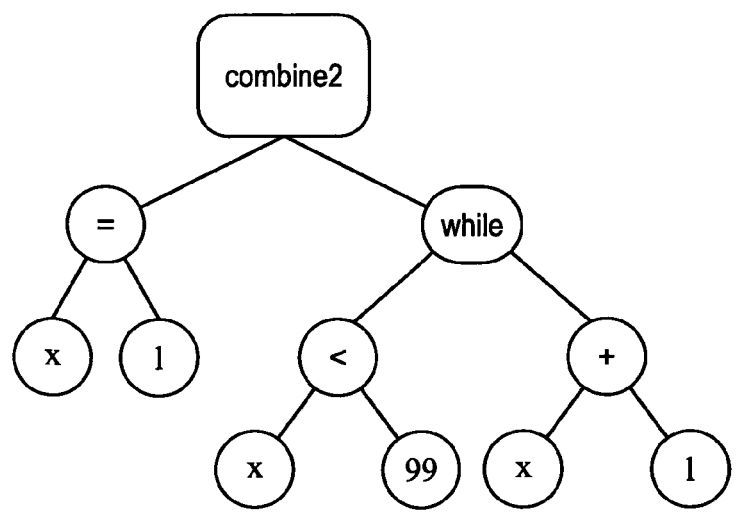
FIG. 2 is a diagram illustrating a computer program represented in the form of a parse tree (PRIOR ART)
Figure 3A:
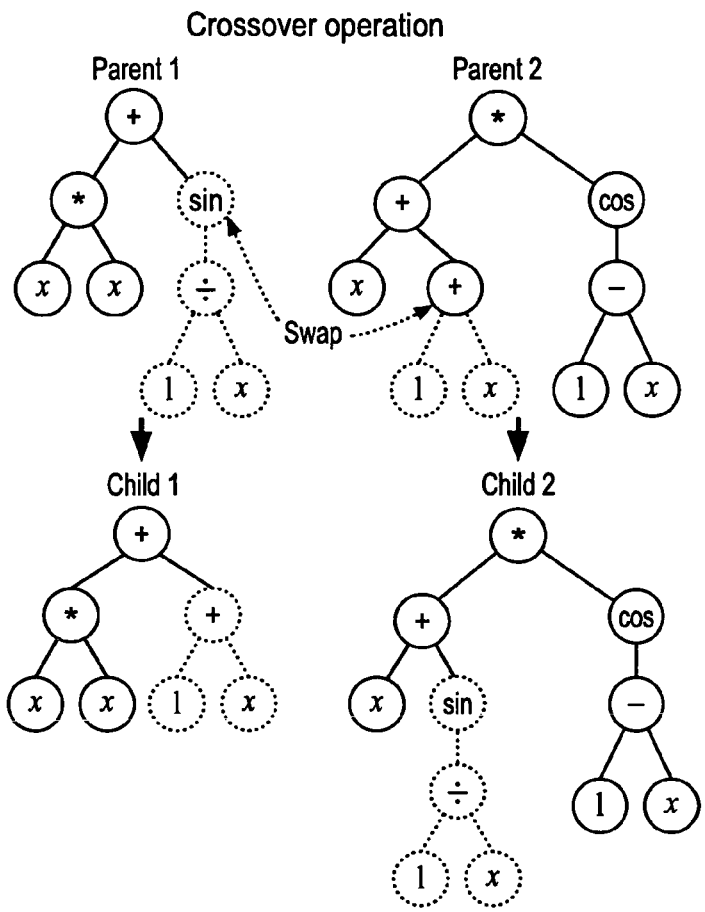
FIG. 3 is a diagram illustrating crossover and mutation operations applied in genetic programming to program portions represented as parse trees (PRIOR ART)
Figure 3B:
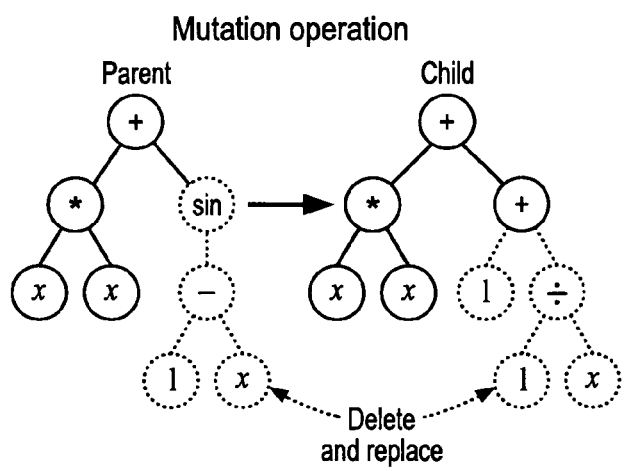
Figure 4:
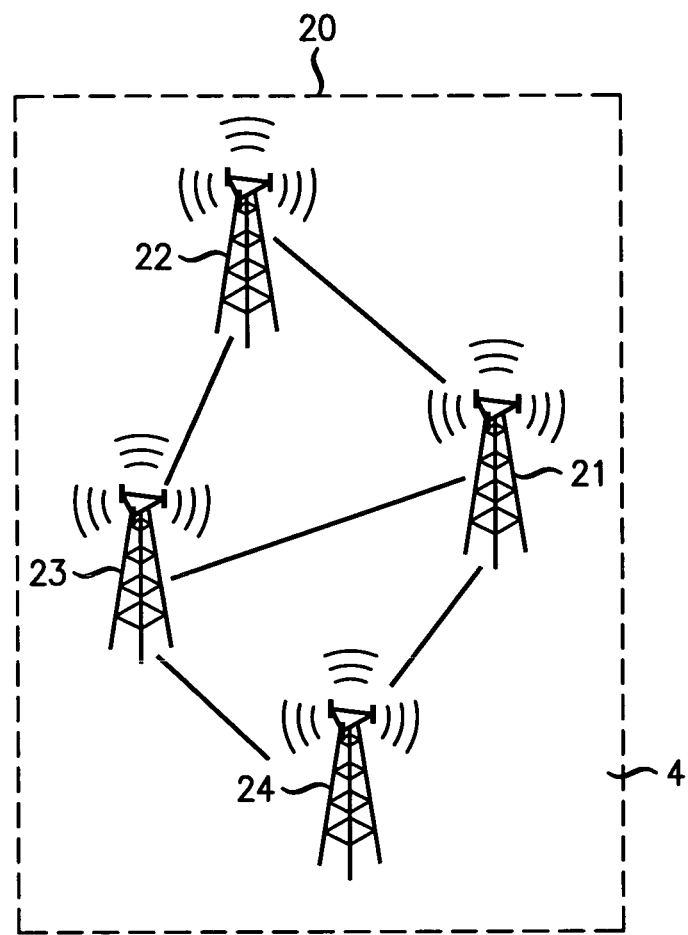
FIG. 4 is a schematic representation of a network for wireless telecommunications according to a first embodiment of the invention.

As shown in FIG. 4, the telecommunications network 2 includes a radio access network 4 which includes some interconnected cellular base stations 21,22,23,24. The base stations 21,22,23,24 all run respective algorithms to perform a predetermined task.

Figure 5:
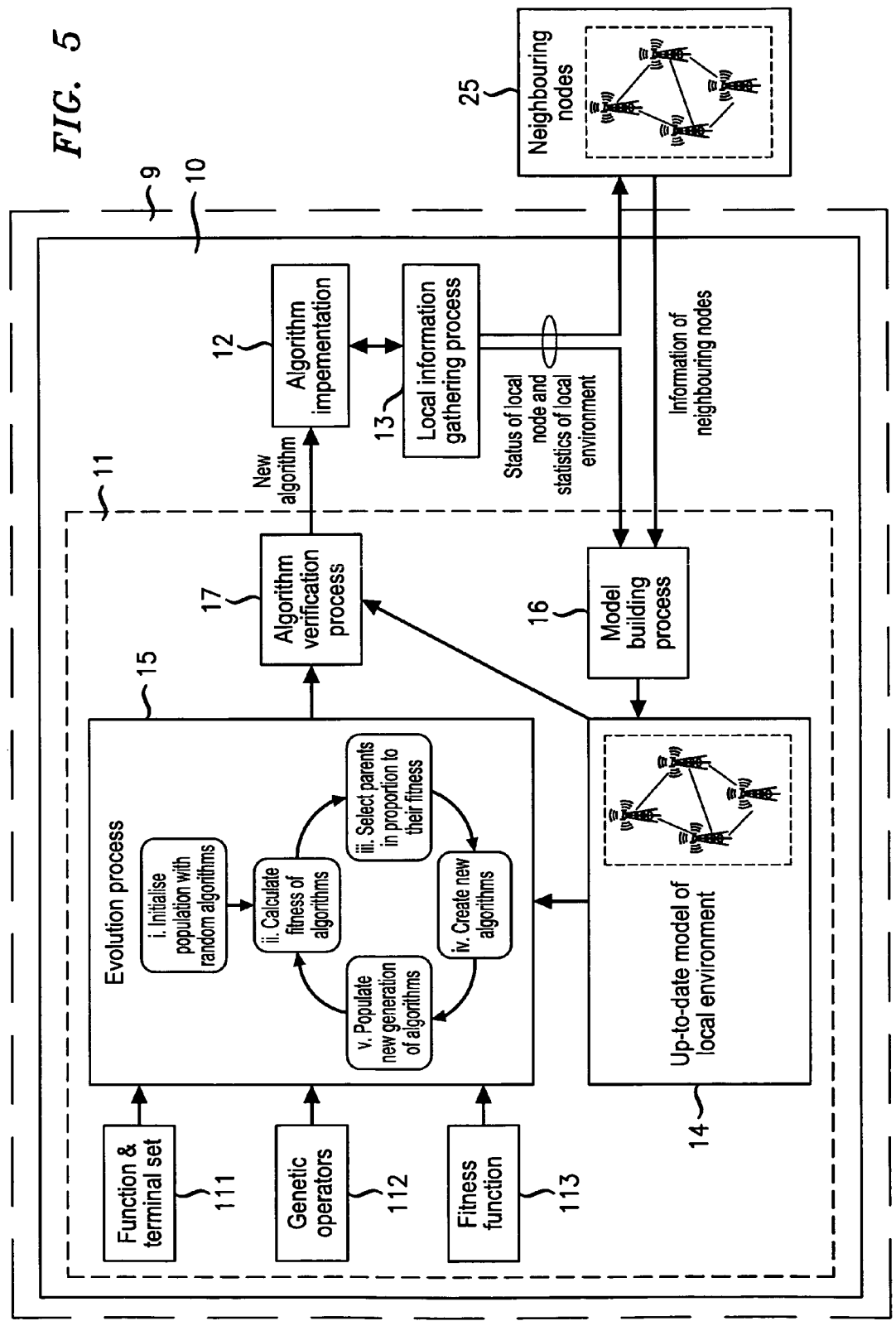
FIG. 5 is a diagram illustrating in more detail one of the base stations shown in FIG. 4 plus one of its neighbouring base stations.

As shown in FIG. 5, each of the base stations includes a respective genetic programming unit 10 that is used to provide new improved versions of the algorithm using genetic programming, as explained in more detail below. Each of the base stations is operative to communicate with and sense its neighbouring base stations. For example a first base station 21 is operative to communicate with and sense its neighbouring base stations 22,23,24.

To avoid confusion, we shall refer to the particular base station being considered as the "local" base station 9, which has a group (denoted 25) of neighbouring base stations. Which base stations belong to the group 25 depends on how the local base station 9 has discovered it neighbours. In this example, the local base station 9 performs measurements of received pilot signals from other base stations so as to identify which of the base stations are in its group 25 of neighbours. In an alternative embodiment, the local base station performs a query-and-response procedure over the backhaul network in order to identify neighbours.

The base stations in the group 25 of neighbours are those that have a significant impact on the local base station, and vice versa. For example, increasing transmit power of base stations in the group 25 will increase interference to the local base station 10.

As will be explained in more detail below, the base stations 21,22,23,24,9,25 in the network 20 each run their own algorithms to perform certain tasks, such as adjusting the size of their radio coverage. The base stations also each run an algorithm adaptation process, using genetic programming, in order to periodically update and refine the exact functional forms of the algorithms that they run. Each base station refines their algorithms locally, so the end effect is that each base station runs their own respective algorithm optimised to suit their own local environment and so likely being unique.

Genetic Programming Unit

As shown in FIG. 5, the genetic programming unit 10 that uses genetic programming to create algorithms used in the base stations includes a genetic processor 11, an algorithm implementation stage 12 and a local information gathering stage 13.

The genetic processor includes a function and terminal set 111, genetic operators 112 and a fitness function 113 as inputs to an evolution processor 15. The function and terminal set 111 are the building blocks of the algorithms. The genetic operators 112 are operations that manipulate existing algorithms to create new ones, and include operations such as mutation and crossover. The fitness function 113 is a function used to calculate the fitness, in other words performance of the algorithms. The fitness function 113 is predetermined based, for example, on network operator's requirements.

In use, the evolution processor 15 acts to run simulations of the network node using the information of the model 14 of the network node and various different generated algorithms and the performance results are used together with the fitness function 13 to calculate the fitness associated with each algorithm. An up-to-date model 14, of the network node is used in these simulations.

As will be explained in more detail below, new and improved algorithms to be used in the base station are generated on an automatic basis. A flowchart of the main steps taken in this automated process is shown in FIG. 6.

Figure 6:
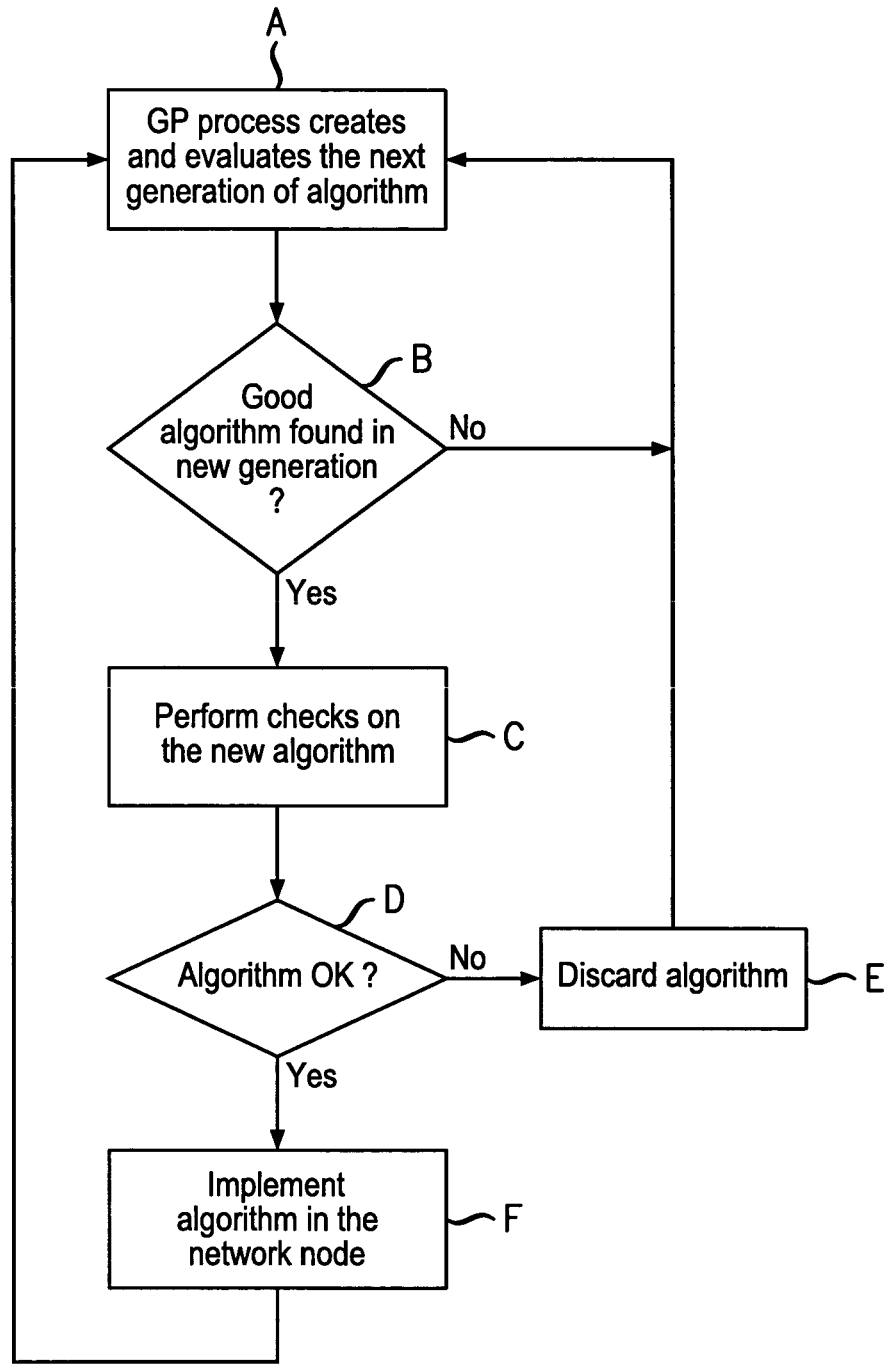
FIG. 6 is a flow chart illustrating operation of the genetic programming unit if the base station shown in FIG. 5.

As shown in FIG. 6, in the genetic programming unit 10, a next generation algorithm is generated and evaluated (step A) as to fitness level. A determination is made (step B) as to whether a generated algorithm meets a predetermined fitness level. Upon the predetermined fitness level being met, the algorithm is deemed good enough for the algorithm verification process to be undertaken. As explained above, the algorithm verification processor 17 pre-tests (step C) the algorithm to check suitability for deployment in the network 2. A determination is then made (step D) as to whether the tests are failed or passed. If the tests are failed the algorithm is discarded (step E) and a return is made to the generation and fitness evaluation (step A). On the other hand, if the tests are passed, then the algorithm is implemented (step F) in the network node.

The steps A and B in FIG. 6 occur in the evolution processor 15 shown in FIG. 5. The steps C, D, and E in FIG. 6 occur in the algorithm verification processor 17 shown in FIG. 5. This is explained in more detail below.

Various components and aspects of the genetic programming unit 10 will now be described in more detail. In particular, the evolution processor, the model building processor, the algorithm verification processor and the algorithm implementation stage will now be described.

Evolution Processor

The function and terminal set 111, genetic operators 112, a fitness function 113 and the simulation results from model (simulator) 14 are input to an evolution processor 15. The evolution processor 15 undertakes genetic programming.

As previously described, genetic programming (GP) involves the following steps:
  (i) Initialise a population of algorithms—a population is the term used for a collection of individual algorithms, the algorithms in the initial population being generated at least somewhat randomly;
  (ii) Calculate the fitness of each of the algorithms in the population—fitness being the term used for a measure of the algorithms performance in achieving the task of the algorithm;
  (iii) Select algorithms to become "parents" based on their fitness;
  (iv) Create new algorithms by applying genetic operators, such as mutation and crossover to the parents selected in the previous step;
  (v) Produce the next generation population of algorithms using newly created algorithms and survivors chosen from the previous generation population.

The above steps (ii) to (v) are repeated until a termination condition is met (for example a target fitness level is met by an algorithm that has been created).

It can be considered that the algorithm output from the evolution processor 15 is one that has been selected by the evolution process. This algorithm is output from the evolution processor 15 to an algorithm verification processor 17.

Model Building Process

In the genetic programming unit 10, there is a model building processor 16 which acts on the model 14 of the network node to keep the model 14 up to date by making use of information on the status of neighbouring nodes 25, such as what algorithm they are currently using plus the traffic conditions that they are experiencing such as load, type of calls etc, and also of local information about the local base station 9 itself.

The local information about the local node 9 itself is gathered by a local information gathering processor 13 that uses various tools to obtain information on the local radio environment, such as measurement reports sent by user terminals, and measurements made by a built-in radio receiver (not shown). This processor 13 also collects internal information that is available, such as statistics regarding the local base station's traffic load. This processor 13 also disseminates relevant information about the local base station 9, such as transmit power and average load in terms of numbers of active users, to its neighbours 20.

Accordingly, the model building processor 16 incorporates significant changes that occur in the radio environment ad conditions applied to the base station so may have an impact on the algorithm evolution process, and also acts to refine the model 14 so as to improve its accuracy. Accordingly, the model changes by being updated from time to time, for example periodically. The model building processor 16 uses information on the network node that is obtained from the network node itself plus its neighbours.

Algorithm Verification

The algorithm verification processor 17 pre-tests the selected algorithm to check suitability for deployment in the base station. The tests are done prior to deployment and are intended to ensure that the algorithm is well-behaved and will not cause unwanted behaviours to occur in the network. This testing is particularly important for self-x algorithms (i.e. self-configuring, self-organising etc) for decentralised control of network nodes, as undesirable and unexpected behaviour may occur. Such undesirable behaviours can cause inefficient operation of the network and in extreme cases can cause cascading failures throughout the network. It should be noted that adverse effects can occur generally in algorithms and are not a specific side effect of being generated by genetic programming.

The algorithm verification processor 17 performs an automated verification process. Although the selected algorithm from the evolution processor 15 was developed using simulated scenarios and an up-to-date model 14 of the base station in its local environment, the algorithm may have flaws causing undesirable outcomes in other scenarios. An example of such a flaw that is easy to detect is a divide-by-zero calculation. Accordingly this pre-testing is undertaken.

Once the algorithm has been pre-tested and deemed suitable, the algorithm is implemented in the network node.

Algorithm Implementation

The algorithm, now deemed suitable, is implemented in the network node by the algorithm implementation stage 12. This algorithm implementation stage 12 takes the algorithm in its parse tree form and translates that into software instructions that replace the previous algorithm used. In this example, the algorithm implementation stage 12 includes an algorithm reader (not shown) which translates and runs the algorithm directly from its parse tree form. In a similar embodiment (not shown) the parse tree is converted into software code (C++, Java) and then compiled.

Algorithm Dissemination to Other Nodes

Figure 7:
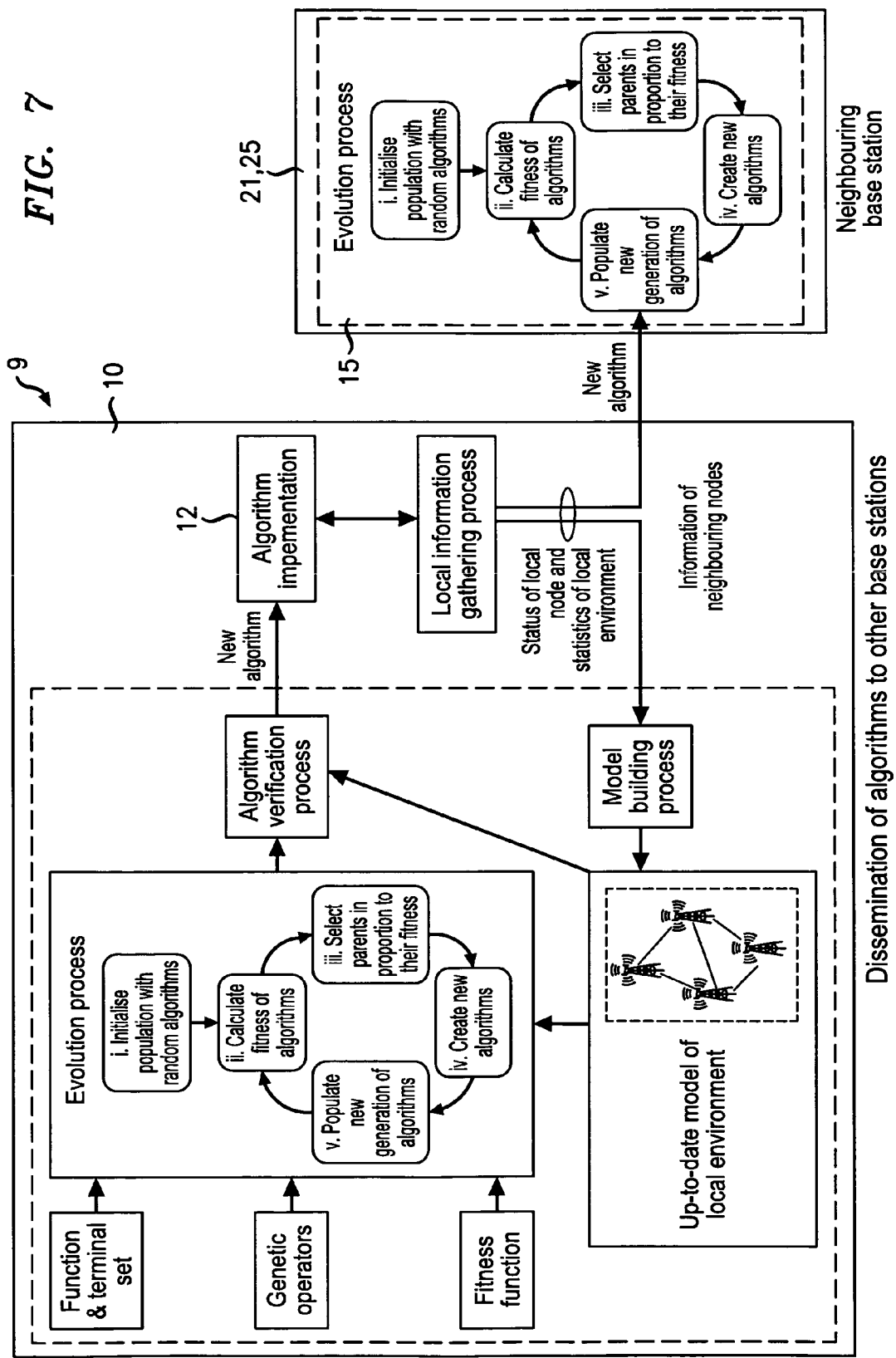
FIG. 7 is a diagram illustrating how an algorithm verified and implemented in one base station becomes a candidate algorithm in a neighbouring base station.

As shown in FIG. 7, the verified algorithm is also sent by the algorithm implementation stage 12 to the neighbouring base stations 25 (one of which denoted 21 is shown for simplicity) so as to be included in their evolution processes. Looking from the neighbours perspective, when the base station 21 receives this algorithm from one of its neighbours, the base station 21 inserts the algorithm as an individual in the current population of algorithms in the evolution process.

The algorithms disseminated to neighbouring algorithms in this way are not immediately used by the neighbours, but only included in the population of the next generation of algorithms to be further evolved. This is shown in FIG. 7 where, from the perspective of the local base station 9, a neighbouring base station 21 receives the new algorithm of the local base station 9. If this received algorithm happens to be the best algorithm amongst the population of base station 21 then the genetic processor 15, as part of its usual operation, starts using that algorithm in subsequent cycles of evolution.

By this step, good algorithms evolved and verified in one base station are spread to other base stations. This may improve the rate of convergence of the algorithm adaptation processes through the network, in what can be seen as a form of parallel computation where the search is being performed by a group of base stations rather than individually. The spread of an algorithm may be limited due to the diverse environments that the base stations experience. For example, a good algorithm for base stations in a dense urban environment would not necessarily work well in a suburban or rural environment.

Dissemination of algorithms as described above, happens both to and from base stations, for example a base station sends good algorithms to its neighbours and also receives good algorithms from them.

Example of Type of Algorithm: Optimising Radio Coverage

Figure 8:
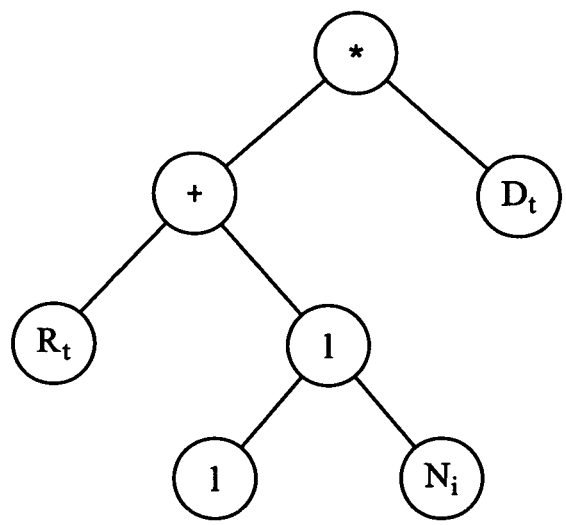
FIG. 8 is an example genetically engineered program for optimising radio cell coverage provided by the genetic programming unit.

An example of a type of algorithm that would be subject to genetic programming and selection as explained above is one for optimising radio coverage of a cell in a wireless network, in other words automatically adjusting the radio coverage are of a base station based on measurements made in the network in the environment of the base station. An example of this type of algorithm is represented in FIG. 8 both in the form of a parse tree and as an equation. The equation is:

$$R_{t+1} = \left(R_t + \frac{1}{N_i}\right) \times D_t$$

where $D_t$ denotes Number of calls dropped during timeslot t, $R_t$ denotes Cell radius during timeslot t, and $N_i$ denotes Total number of increments performed.

Example function and terminal sets used as input to the evolution processor in this example are as follows:

Function set F={+, −, *, /}, is composed of basic mathematical operations.

Terminal set T={Dt, Rt, Ct, Ni, 1}, is composed of measurements, node states, and constants as follows:

$D_t$—Number of calls dropped during timeslot t.
$R_t$—Cell radius during timeslot t.
C—Coverage overlap.
$N_i$—Total number of increments performed.

Some Variants

Network nodes in a wireless cellular network have been referred to above, but the approach is applicable in other types of network nodes and networks. For example, algorithms specialised to particular nodes and their specific local environments, are also useful in Internet Protocol networks, for example where it is useful to support rerouting and reallocation of resources so as to maintain basically seamless mobility and Quality of Service (QoS) for mobile users. Examples include wireline access network nodes, such as Digital Subscriber Line (DSL) lines and residential gateways.

The approach above has been focussed on use of genetic programming to generate self-x, i.e. self-configuring, self-adapting algorithms. In some other embodiments, the approach is used to provide algorithms for implementation that are not self-x algorithms.

The present invention may be embodied in other specific forms without departing from its essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

A person skilled in the art would readily recognize that steps of various above-described methods can be performed by programmed computers. Some embodiments relate to program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. Some embodiments involve computers programmed to perform said steps of the above-described methods.

The invention claimed is:

1. A method of evolving algorithms for network node control in a telecommunications network, comprising:
   at a network node of a telecommunications network formed by a plurality of network nodes, periodically updating a model of the network node, the model including a local environment in relation to the network node, the local environment including one or more other nodes neighboring the network node, and
   evolving control algorithms for the network node using a genetic programming process at the network node, the genetic programming process comprising:
      generating at least one next generation control algorithm,
      determining a fitness level of the at least one next generation control algorithm based at least in part on an updated version of the model,
      selecting each at least one next generation control algorithm that meets a predetermined fitness level in relation to performance of a particular task associated with the corresponding control algorithm, and
      repeating the generating, determining, and selecting of the genetic programming process to provide a series of next generation control algorithms adapted to periodic changes in the model;
at the network node, verifying suitability of each control algorithm of the series of next generation control algorithms to identify one or more next generation control algorithms suitable for implementation by the network node to perform the particular task associated with the corresponding control algorithm; and
sending each control algorithm deemed suitable for implementation by the network node from the network node to the one or more other nodes;
wherein at least one control algorithm sent to the one or more other nodes is used in at least one of said one or more other nodes in conjunction with a corresponding genetic programming process to evolve control algorithms at the corresponding other node.

2. The method according to claim 1, wherein the model is updated with information as to at least one of radio conditions and traffic conditions locally specific to the network node.

3. The method according to claim 1, wherein information from at least one other node neighbouring the network node is used to update the model.

4. The method according to claim 3, wherein said information from the at least one other node relates to at least one of traffic conditions and radio conditions experienced by the respective other node.

5. The method according to claim 1, wherein the network node is a wireless telecommunications base station.

6. The method according to claim 5, wherein the wireless telecommunications base station is a femtocell base station.

7. The method according to claim 5 wherein at least one of the control algorithms being evolved at the network node is for adjusting a radio coverage area of the wireless telecommunications base station.

8. The method according to claim 1, further comprising:
at the network node, implementing at least one control algorithm deemed suitable for the network node.

9. The method according to claim 1, wherein said at least one other node determines a fitness level of the at least one control algorithm based at least in part on a model of the corresponding other node and selects each at least one control algorithm that meets a predetermined fitness level in relation to performance of a particular task associated with the corresponding control algorithm to provide one or more control algorithms adapted to changes in the model.

10. An apparatus for evolving algorithms for network node control in a telecommunications network, comprising:
a model building processor configured to periodically update a model of a network node of a telecommunications network formed by a plurality of network nodes, the model including a local environment in relation to the network node, the local environment including one or more other nodes neighboring the network node;
an evolution processor configured to evolve control algorithms for the network node using a genetic programming process, wherein, in conjunction with the genetic programming process, the evolution processor is configured to generate at least one next generation control algorithm, to determine a fitness level of the at least one next generation control algorithm based at least in part on an updated version of the model, to select each at least one next generation control algorithm meeting a predetermined fitness level in relation to performance of a particular task associated with the corresponding control algorithm, and to repeat the generating, determining, and selecting of the genetic programming process to provide a series of next generation control algorithms adapted to periodic changes in the model;
an algorithm verification processor configured to verify suitability of each control algorithm of the series of next generation control algorithms to identify one or more next generation control algorithms suitable for implementation by the network node to perform the particular task associated with the corresponding control algorithm;
wherein the evolution processor is configured to receive one or more next generation control algorithm from at least one of the one or more other nodes and to use the one or more next generation control algorithm in conjunction with the genetic programming process.

11. The apparatus according to claim 10, wherein each one or more next generation control algorithm having been deemed suitable for implementation by the corresponding other node.

12. A network node in a telecommunication network, comprising:
a genetic programming unit, comprising:
a model building processor configured to periodically update a model of a network node of a telecommunications network formed by a plurality of network nodes, the model including a local environment in relation to the network node, the local environment including one or more other nodes neighboring the network node, and
an evolution processor configured to evolve control algorithms for the network node using a genetic programming process, wherein, in conjunction with the genetic programming process, the evolution processor is configured to generate at least one next generation control algorithm, to determine a fitness level of the at least one next generation control algorithm based at least in part on an updated version of the model, to select each at least one next generation control algorithm meeting a predetermined fitness level in relation to performance of a particular task associated with the corresponding control algorithm, and to repeat the generating, determining, and selecting of the genetic programming process to provide a series of next generation control algorithms adapted to periodic changes in the model;
an algorithm verification processor configured to verify suitability of each control algorithm of the series of next generation control algorithms to identify one or more next generation control algorithms suitable for implementation by the network node to perform the particular task associated with the corresponding control algorithm;
wherein the evolution processor is configured to receive one or more next generation control algorithm from at least one of the one or more other nodes and to use the one or more next generation control algorithm in conjunction with the genetic programming process;
wherein the evolution processor is configured to send each control algorithm deemed suitable for implementation by the network node to the one or more other nodes;
wherein at least one control algorithm sent to the one or more other nodes is used in at least one of said one or more other nodes in conjunction with a corresponding genetic programming process to evolve control algorithms at the corresponding other node.

13. The method according to claim 1, further comprising:
receiving one or more next generation control algorithm from at least one of the one or more other nodes at the network node; and
using the one or more next generation control algorithm in conjunction with the genetic programming process.

14. The apparatus according to claim 10, wherein the model building processor is configured to update the model with information as to at least one of radio conditions and traffic conditions locally specific to the network node.

15. The apparatus according to claim 10, wherein the evolution processor is configured to send each control algorithm deemed suitable for implementation by the network node to at least one of the network node and the one or more other nodes.

16. The apparatus according to claim 15, wherein at least one control algorithm sent to the one or more other nodes is used in at least one of said one or more other nodes in conjunction with a corresponding genetic programming process to evolve control algorithms at the corresponding other node;
wherein said at least one other node determines a fitness level of the at least one control algorithm based at least in part on a model of the corresponding other node and selects each at least one control algorithm that meets a predetermined fitness level in relation to performance of a particular task associated with the corresponding control algorithm to provide one or more control algorithms adapted to changes in the model.

17. The network node according to claim 12, wherein said at least one other node determines a fitness level of the at least one control algorithm based at least in part on a model of the corresponding other node and selects each at least one control algorithm that meets a predetermined fitness level in relation to performance of a particular task associated with the corresponding control algorithm to provide one or more control algorithms adapted to changes in the model.

18. The apparatus according to claim 10, wherein the network node is configured to implement at least one control algorithm deemed suitable for the network node by the algorithm verification processor.

19. The network node according to claim 12, wherein the network node is configured to implement at least one control algorithm deemed suitable for the network node by the algorithm verification processor.

20. The network node according to claim 12, wherein the model building processor is configured to update the model with information as to at least one of radio conditions and traffic conditions locally specific to the network node.

21. The network node according to claim 12, wherein the evolution processor is configured to receive one or more next generation control algorithm from at least one of the one or more other nodes at the network node and to use the one or more next generation control algorithm in conjunction with the genetic programming process.

* * * * *